March 15, 1949.                    D. LELONG                    2,464,696
                        WINDSHIELD CONSTRUCTION FOR VEHICLES
Filed Aug. 1, 1946                                          2 Sheets-Sheet 1
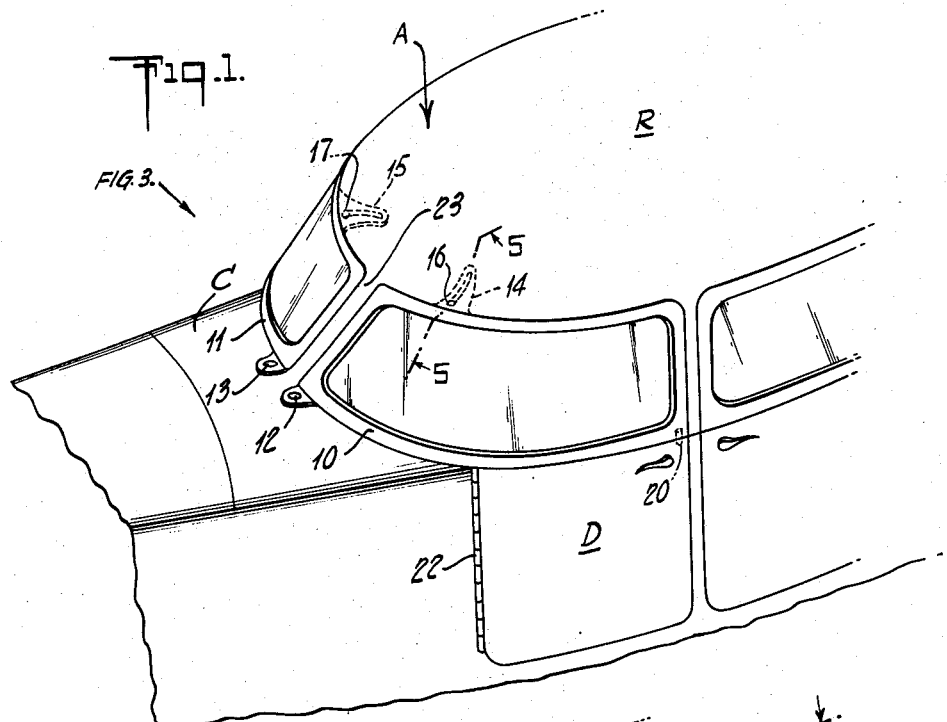
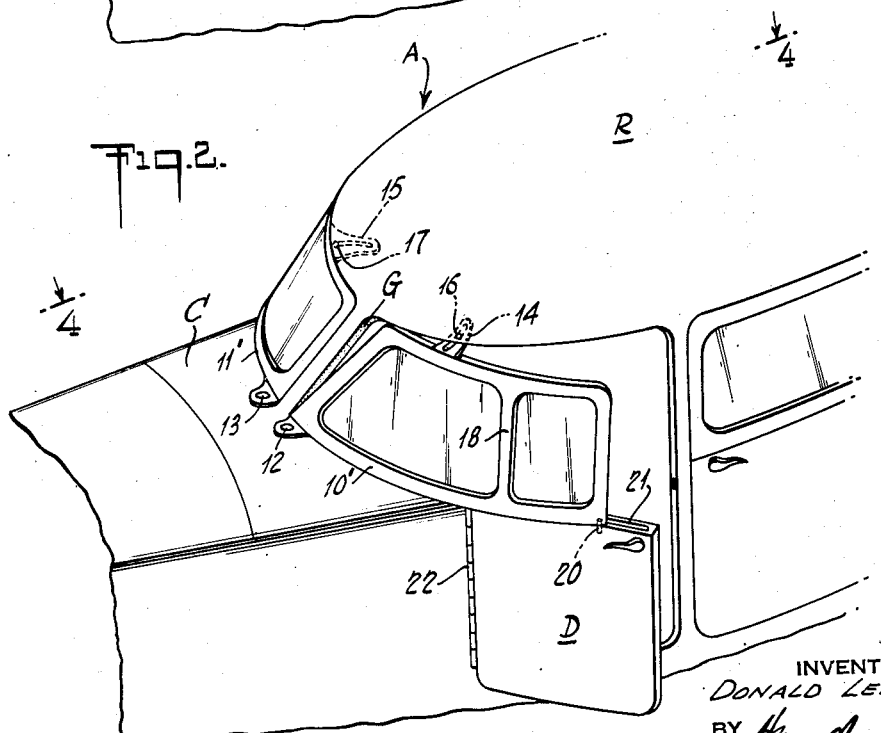
INVENTOR
DONALD LELONG.
BY
ATTORNEY March 15, 1949.　　　　D. LELONG　　　　2,464,696
WINDSHIELD CONSTRUCTION FOR VEHICLES
Filed Aug. 1, 1946　　　　　　　　　　2 Sheets-Sheet 2
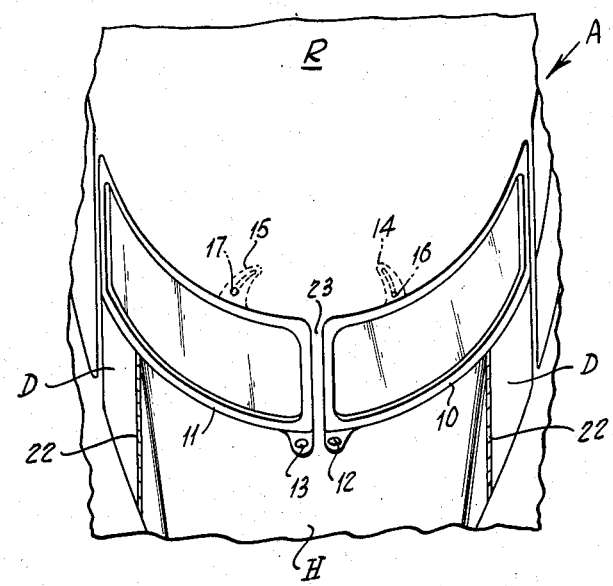
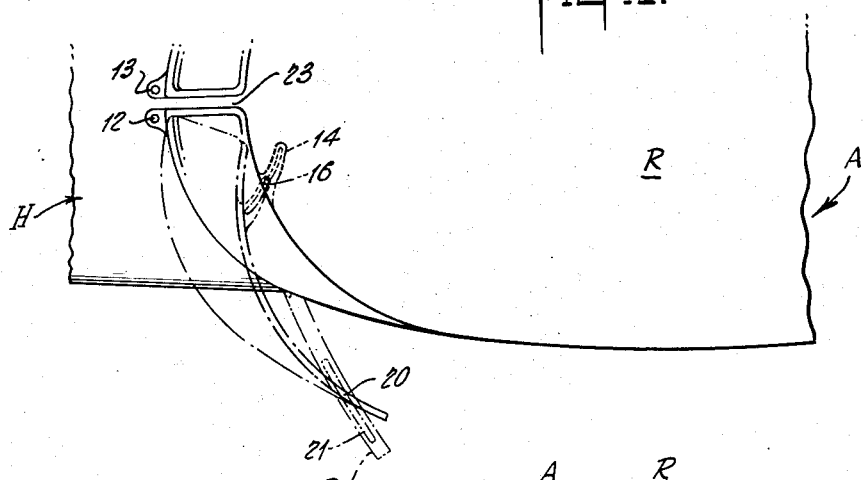
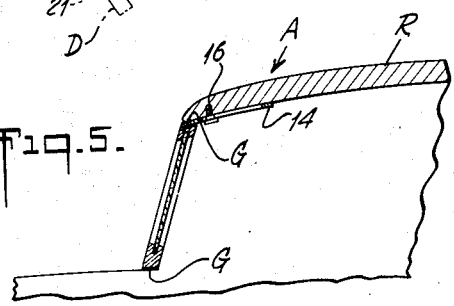
INVENTOR
DONALD LELONG.
BY
ATTORNEY Patented Mar. 15, 1949

2,464,696

UNITED STATES PATENT OFFICE 2,464,696

WINDSHIELD CONSTRUCTION FOR VEHICLES

Donald Lelong, Essex Fells, N. J.

Application August 1, 1946, Serial No. 687,767

5 Claims. (Cl. 296—28)

1

This invention relates to improvements in windshields for vehicles. In conventional windshields of vehicles such as automobiles, corner posts are provided, the windshield terminating at said corner posts. Such corner posts seriously obstruct the view of the driver.

It is the object of my invention to provide a windshield for vehicles, so designed that the same dispenses with the necessity for corner posts.

It is a further object of the invention to provide windshield section frames of unique construction which are pivoted at a point medially of the hood of the vehicle and continue therearound to points generally corresponding with the remote ends of the doors leading into the vehicle.

An embodiment of a structure employing my invention is shown in the accompanying drawings and described in detail in the ensuing specification. This embodiment is merely by way of example; my invention is not limited thereto but includes all other forms which would come within the scope of the appended claims. In the drawings, Fig. 1 is a perspective view of a vehicle embodying my invention, Fig. 2 is a similar view, with a windshield section frame shown in the position the same occupies on opening the door of the vehicle, Fig. 3 is a perspective view taken at the point designated by the arrow "Fig. 3" at Fig. 1, Fig. 4 is a diagrammatic, top plan view, taken on line 4—4 of Fig. 2, and Fig. 5 is a fragmentary, vertical, sectional view taken on line 5—5 of Fig. 1.

In the drawings, a vehicle which is generally designated by the numeral A and which may be an automobile, is shown provided with a center windshield post 23 connecting the roof R of said vehicle and the cowl C thereof, said center windshield post serving also as the partition for the windshield section frames 10, 11 embodying my invention. The opening defined by the center windshield post 23, cowl C and roof R of the car is preferably provided with gaskets G. The windshield section frames 10 and 11 embodying my invention are pivoted as at 12 and 13 at their inner ends adjacent the post 23. Said frame sections are provided with slotted guide arms 14, 15 at their upper ends to receive guide pins 16, 17 fixed to the roof R of the vehicle and depending therefrom. At their outer ends, the windshield section frames are provided with depending studs, such as the stud 20 shown in Fig. 2, adapted to be slidably received within slots 21 in the doors D, said doors being pivoted as at 22 so as to open

2 rearwardly. If desired, the frames 10' and 11' may be provided with partitions 18 (see Fig. 2) adjacent their outer ends to divide said frames into sections for convenience, for example, of mounting transparent pane members therein. Thus, the larger division of the frame shown in Fig. 2 may contain a stationary frame while the smaller division thereof may contain one which is movably positioned therein and which may be rotated or otherwise moved for the admission of air into the vehicle A.

As will be noted from Fig. 3, when the doors D of the vehicle A are closed, the frames 10 and 11 close the vehicle body and provide for unimpaired vision of the driver at the corners thereof where, for example, at the corners directly in line with the hinges 22 of the doors D, corner posts are normally provided. In opening the door D as in Fig. 2 the frame pivots outwardly on the pivot 12, with the depending stud 20 riding in the slot 21 of the door.

While I have shown in the drawings and described in the above specification, a convenient form of structure embodying my invention, it will be apparent from such disclosure that the invention is capable of many modifications without departing from the spirit and scope therof, as set forth in the appended claims.

Having thus described my invention, what I claim as new and desire to secure by Letters Patent is:

1. In a vehicle having a roof and a cowl panel, a center windshield post connecting said roof and cowl panel, and a pair of frame members pivoted to the cowl panel adjacent said center post, transparent windshield panels mounted in the frame members, slotted arms on the upper ends of said frame members, guide pins fixed to and depending from the roof of said vehicle and passing through said slots, studs depending from the outer ends of said frames, and doors pivoted to the cowl panel laterally thereof having slots in the upper edges of the doors for the reception of said studs, the windshield frame members being substantially coextensive with the doors when closed, the studs sliding in the slots of the doors to enable the doors to open and the frame members to pivot relatively to the roof and cowl panel responsively to opening of the doors.

2. In a vehicle having a roof and a cowl panel, a center windshield post connecting said roof and cowl panel, a windshield frame member pivoted to the cowl panel adjacent said center windshield post, the upper end of said frame member being provided with a slotted arm, a guide pin fixed to and depending from the roof of said vehicle and passing through the slot of said arm, the outer end of said frame member being provided with a depending stud, and a door pivoted to the cowl panel laterally thereof and having a slot in the upper edge of the door for the reception of said stud on the frame member, the said frame member overlying the door in edge-to-edge relation when in closed position and being substantially coextensive therewith.

3. In a vehicle having a roof and a cowl panel, a center windshield post connecting said roof and cowl panel, and a pair of windshield frame members pivoted to the cowl panel adjacent said center windshield post, studs depending from the outer ends of said frames, and doors pivoted to the cowl panel laterally thereof and having slots in their upper edges for the reception of said studs on the windshield frame members, the said windshield frame members being substantially coextensive with the doors in edge-to-edge relation therewith when closed, the studs sliding in the slots of the doors to enable the doors to open and the frame members to pivot relatively to the roof and cowl panel responsively to opening of the doors.

4. In a vehicle having a roof and cowl panel, a center windshield post connecting said roof and cowl panel, and a pair of windshield frame members pivoted to the cowl panel, complementary guide means on said roof and windshield frame members, studs depending from the outer ends of said frames, and doors pivoted to the cowl panel laterally thereof and having slots in their upper edges for the reception of said studs on the windshield frame members, the said windshield frame members when in closed position overlying the doors in edge-to-edge relation and being substantially coextensive therewith.

5. In a vehicle having a roof and cowl panel, and doors pivoted to the cowl panel laterally thereof, a windshield construction comprising a center windshield post connecting the roof and top of the cowl panel, arcuate windshield frame members extending from the center windshield post to the doors and being substantially coextensive with the doors when the doors are in closed position, the said windshield frame members overlying the doors in edge-to-edge relation therewith, pivotal connecting means between the windshield frame members and the top of the cowl panel adjacent to the center windshield post, complementary guide means on the roof and on the windshield frame members, the doors being provided with slots along their upper edges, studs depending from the windshield frame members entering the slots on the doors, and arcuate and transparent windshield panels in the windshield frame members, extending continuously and uninterruptedly from the center windshield post to the doors for presenting unobstructed fields of vision from the center windshield post to both sides of the vehicle.

DONALD LELONG.

REFERENCES CITED

The following references are of record in the file of this patent:

UNITED STATES PATENTS

| Number | Name | Date |
|---|---|---|
| 342,632 | Reade | May 25, 1886 |
| 1,389,549 | Hardin | Aug. 30, 1921 |
| 1,795,208 | Garner | Mar. 3, 1931 |
| 2,043,756 | Lalancette | June 9, 1936 |
| 2,089,282 | Macauley | Aug. 10, 1937 |
| 2,141,298 | Heinz | Dec. 27, 1938 |
| 2,168,533 | Nickola | Aug. 8, 1939 |
| 2,355,264 | Bloomfield | Aug. 8, 1944 |

FOREIGN PATENTS

| Number | Country | Date |
|---|---|---|
| 66,653 | Switzerland | Oct. 18, 1913 |
| 400,467 | Great Britain | Oct. 26, 1933 |